United States Patent
Haney

(10) Patent No.: US 6,595,812 B1
(45) Date of Patent: Jul. 22, 2003

(54) AMPHIBIOUS VEHICLE

(76) Inventor: Harry Haney, 2819 Townline, Rhodes, MI (US) 48652

( * ) Notice: Subject to any disclaimer, the term of this patent is extended or adjusted under 35 U.S.C. 154(b) by 0 days.

(21) Appl. No.: 10/075,666

(22) Filed: Feb. 15, 2002

(51) Int. Cl.⁷ .......................................... B63H 21/175
(52) U.S. Cl. ................. 440/11; 440/12.63; 440/12.5; 114/360
(58) Field of Search ................ 440/12.5, 12.51, 440/12.56, 12.63, 11; 114/61.1, 123, 144 R, 248, 284, 292, 343, 360, 364; 180/182, 184, 185, 190

(56) References Cited

U.S. PATENT DOCUMENTS

| | | | | |
|---|---|---|---|---|
| 2,967,507 A | * | 1/1961 | Schultz | 114/267 |
| 3,011,184 A | * | 12/1961 | Curcio | 441/40 |
| 3,404,745 A | * | 10/1968 | Smieja | 180/193 |
| 3,412,821 A | * | 11/1968 | Humphrey | 180/9.64 |
| 3,474,751 A | * | 10/1969 | Hebert | 440/12.64 |
| 3,521,595 A | | 7/1970 | Mix | |
| 3,521,717 A | * | 7/1970 | Coons | 180/185 |
| 3,593,684 A | | 7/1971 | Cogliano | |
| 3,626,891 A | * | 12/1971 | Sessions | 440/11 |
| 3,646,904 A | * | 3/1972 | Lanning et al. | 114/61.22 |
| 3,707,938 A | | 1/1973 | Olson | |
| 3,783,959 A | * | 1/1974 | Krume | 180/183 |
| 3,826,216 A | | 7/1974 | Rhody | |
| 3,853,085 A | | 12/1974 | Halboth | |
| 3,935,832 A | | 2/1976 | Bawden et al. | |
| 4,013,029 A | | 3/1977 | Rhody | |
| 4,135,470 A | * | 1/1979 | Ono | 114/55.54 |
| 4,141,309 A | | 2/1979 | Halboth | |
| 4,269,598 A | * | 5/1981 | Labelle | 440/11 |
| 4,387,661 A | * | 6/1983 | Duff | 114/12.66 |
| 4,459,932 A | * | 7/1984 | Hildebrand | 114/270 |
| 4,534,437 A | * | 8/1985 | Howerton et al. | 180/185 |
| 4,893,692 A | * | 1/1990 | Smith | 180/190 |
| 5,117,764 A | * | 6/1992 | Kretzer, Jr. | 114/361 |
| 5,150,662 A | | 9/1992 | Boyd et al. | |
| 5,184,564 A | * | 2/1993 | Robbins et al. | 114/345 |
| 5,282,437 A | * | 2/1994 | Avillez de Basto | 114/345 |
| 5,443,028 A | * | 8/1995 | Keen | 114/248 |
| 5,682,832 A | | 11/1997 | Millard | |
| 5,685,254 A | * | 11/1997 | Jacques | 114/361 |
| 5,746,150 A | * | 5/1998 | Beaulac et al. | 114/248 |
| 6,062,156 A | | 5/2000 | Radke et al. | |
| 6,070,546 A | | 6/2000 | Downey et al. | |
| 6,139,378 A | | 10/2000 | Kufahl | |

FOREIGN PATENT DOCUMENTS

| | | | | |
|---|---|---|---|---|
| DE | 1002650 | * | 2/1957 | 440/12.51 |
| GB | 1388298 | * | 3/1975 | 440/12.5 |

* cited by examiner

Primary Examiner—S. Joseph Morano
Assistant Examiner—Ajay Vasudeva
(74) Attorney, Agent, or Firm—John J. Swartz

(57) ABSTRACT

An amphibious vehicle for traversing a body of water or solid terrain such as a layer of ice floating atop the body of water. The vehicle includes a floatable boat hull having an elongate aperture there-through, and a snowmobile for traveling over the solid terrain received in the opening and sealed to the hull in water impervious relation. The snowmobile includes an endless drive track for supporting the hull in spaced relation with solid terrain being traversed and for rearwardly propelling water in the body of water to forwardly propel the vehicle over solid terrain or through the water, and a pair of skis which support the front of the hull in spaced relation with the solid terrain being traversed and include upturned forward ends mounting upstanding rudders for steering the boat hull as the vehicle traverses a body of water. The hull includes upwardly extending, downwardly opening pockets for receiving the front upturned ends of the skis and stabilizing arms which are coupled between the frame and the skis. Upwardly inclined guides are provided on the underside of the hull for upwardly guiding the skis out of the water onto the ice floating on the water as the vehicle exits the water and moves onto the ice.

34 Claims, 9 Drawing Sheets

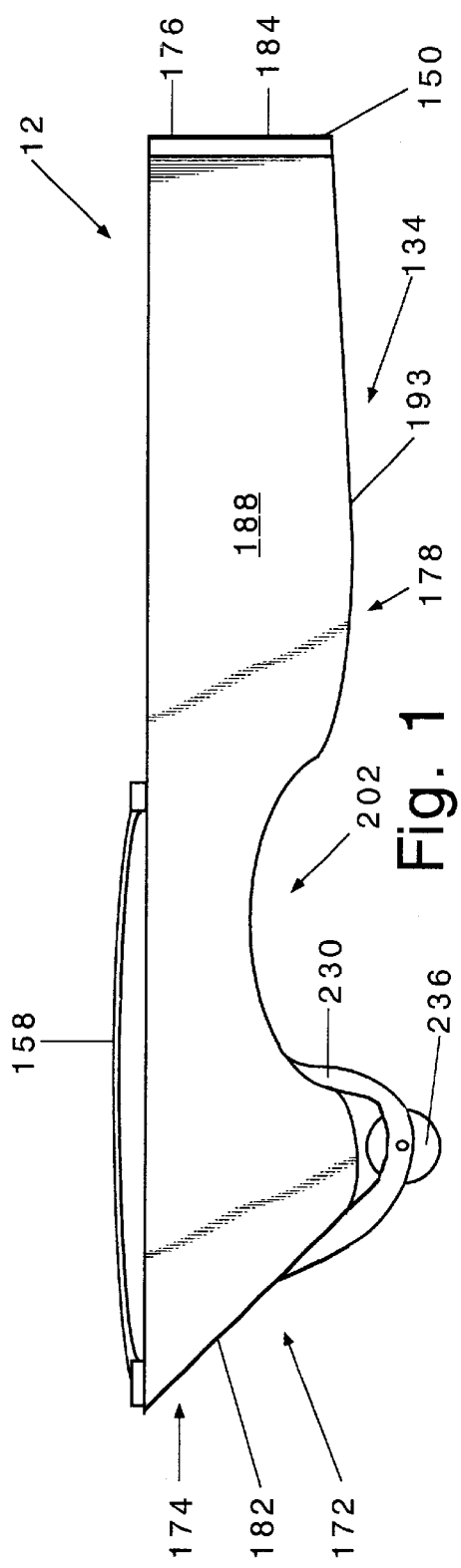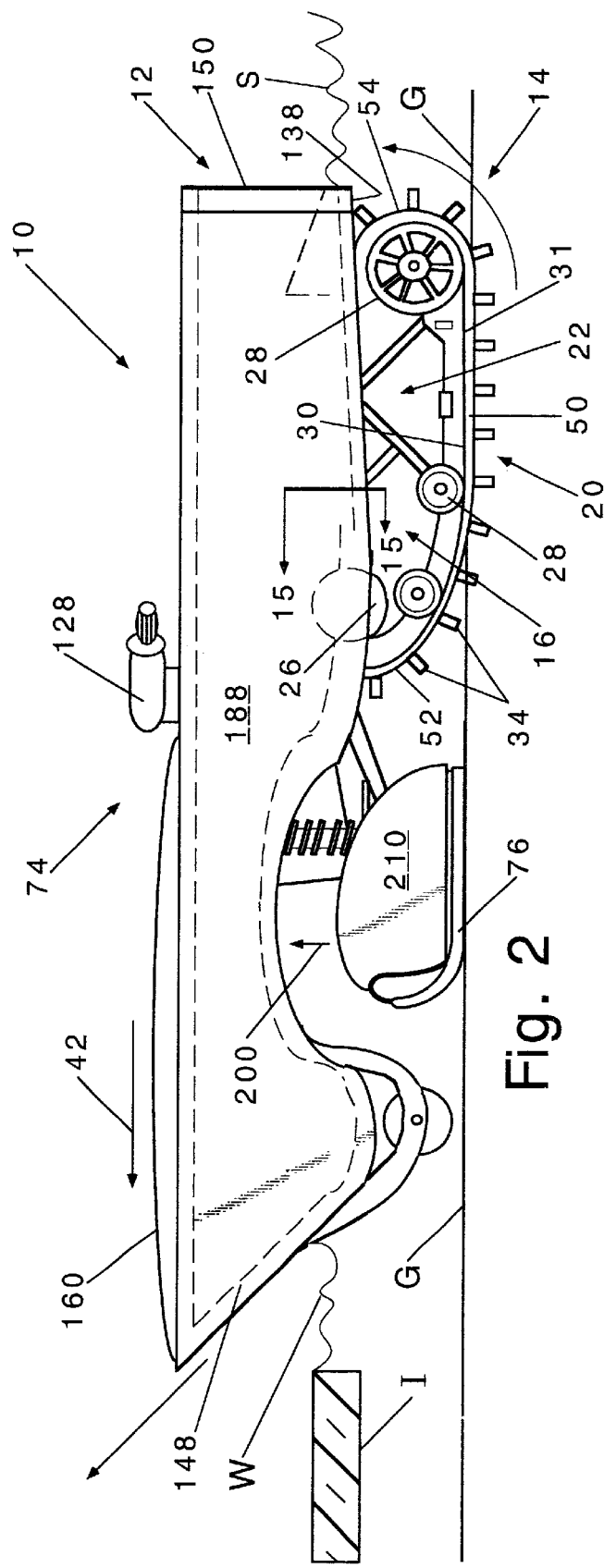

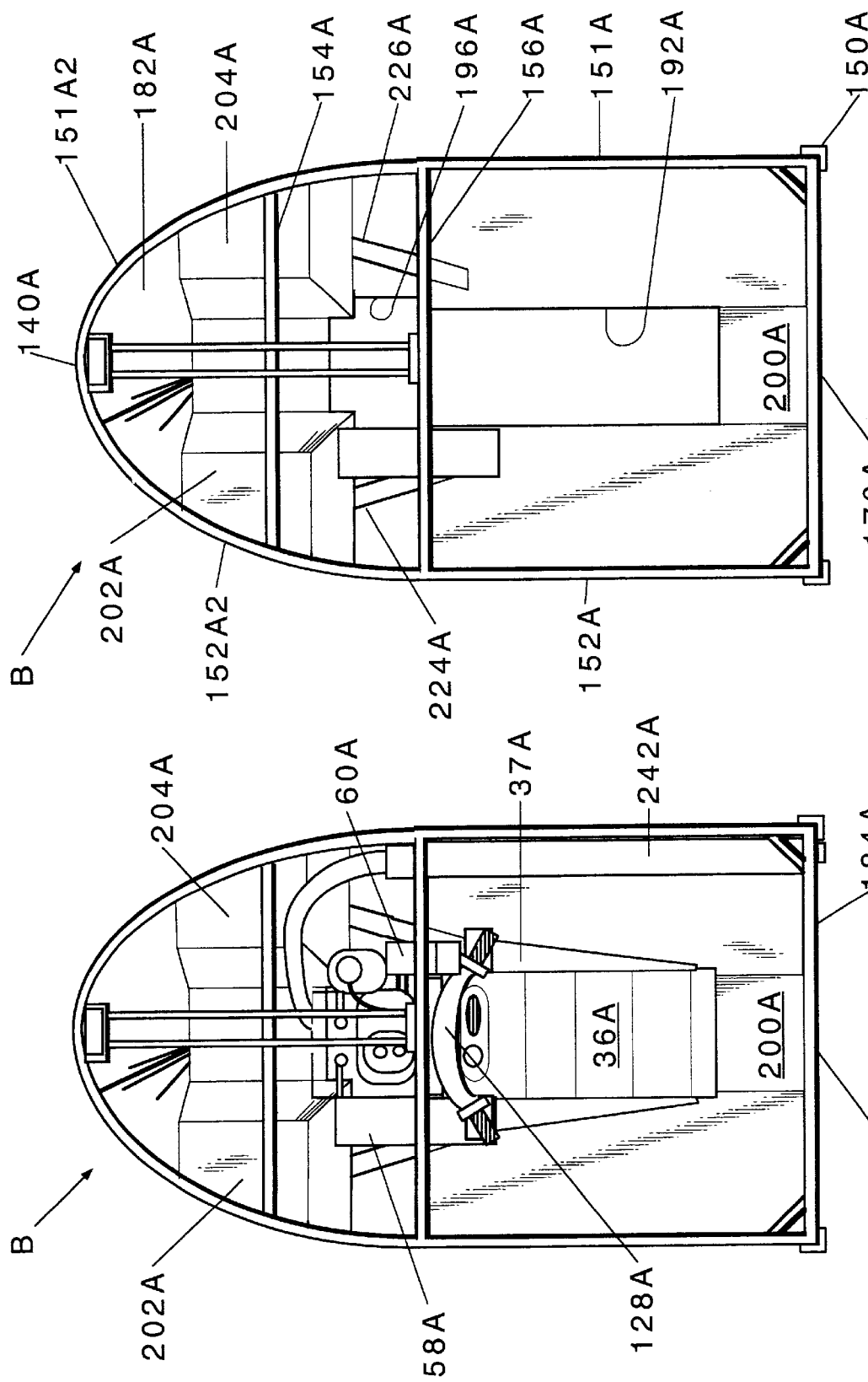

AMPHIBIOUS VEHICLE

BACKGROUND OF THE INVENTION

1. Field of the Invention

This invention relates to an amphibious vehicle and more particularly to an amphibious vehicle including a snowmobile for traveling over solid terrain, such as ice floating atop a body of water, and a boat hull for floatably supporting the snowmobile in the body of water.

2. Description of Prior Art and Objects

A snowmobile is a vehicle, particularly useful in negotiating snow and ice, which includes an endless track that normally propels the vehicle forwardly over solid terrain and a pair of steerable skis which bear against the terrain to direct the vehicle's path of travel. Ice fishermen have found snowmobiles particularly useful in traveling over ice to a favorite ice fishing location. In the early and late portions of the winter, portions of the ice will frequently be relatively thin due to various freezing factors such as increasing temperature, wind shifts and water currents. Each year many people drown as a result of the snowmobile breaking through the thin ice.

It has also been known that ice fishermen become disoriented in foggy conditions and will mistakenly drive their snowmobile in a direction away from land directly into open water. Accordingly, it is an object of the present invention to provide a new and novel vehicle which will increase safety of snowmobile operators traveling over ice.

U.S. Pat. No. 6,139,378 issued to Larry L. Kufhal on Oct. 31, 2000, discloses a pontoon boat which has an outboard motor detachably slidably mounted on the rear end thereof for propelling the boat through water. The outboard motor can be slidably removed and the boat converted to a land vehicle by replacing the outboard motor with an endless track construction. This prior art construction includes a catamaran type hull which is not solid and is not sealed to the snowmobile and does not in fact include a snowmobile. Rather, the alternate installation and removal of the track is cumbersome and time consuming. It is another object of the present invention to provide a new and novel amphibious vehicle which can, without modification, travel over solid surfaces, such as ice, as well as through a body of water.

It is a further object of the present invention to provide a new and novel amphibious vehicle for use by rescue personnel in traveling over ice and immediately, without modification, into a body of water to rescue someone who has broken through the ice.

U.S. Pat. No. 6,070,546 issued to Hugh Downey, et al, on Jun. 6, 2000, discloses a snowmobile equipped with one or more flotation devices to floatably support the snowmobile in the event the snowmobile breaks through ice on the frozen surface of a body of water. This patent does not disclose the concept of a boat hull sealed to the snowmobile frame. Accordingly, it is a still further object of the present invention to provide an amphibious vehicle of the type described including a boat hull sealed to a snowmobile in water impervious relation.

U.S. Pat. No. 5,150,662 issued to James A. Boyd, et al on Sep. 29, 1992, and U.S. Pat. No. 6,062,156 issued to Glen Redke, et al on May 16, 2000, each discloses a snowmobile powered water craft utilizing pontoons that are mounted on the skis and the back of the snowmobile but such pontoons are not sealed to the frame of the snowmobile. Accordingly, it is another object of the present invention to provide a new and novel amphibious vehicle having a floatation device for a snowmobile which is mounted such that the skis and track of the snowmobile support the hull in spaced relation with ice being traversed but which will floatably support the snowmobile in a body of water.

It is yet another object of the present invention to provide an amphibious vehicle including a combination of an upwardly opening boat hull having an aperture therethrough for receiving a snowmobile.

The following U.S. patents also disclose a water craft including a snowmobile having the skis and the endless track mechanism removed therefrom and mounting the remaining snowmobile structure on a pontoon construction:

| U.S. Pat. No. | Inventor | Issue Date |
| --- | --- | --- |
| 3,646,904 | Charles T. Lanning, et al | Mar. 7, 1972 |
| 3,707,938 | John R. Olson | Jan. 2, 1973 |
| 3,853,085 | Robert V. Halboth | Dec. 10, 1974 |
| 3,935,832 | Ralph D. Bawden, et al | Feb. 3, 1976 |
| 4,013,029 | Howard A. Rhody | Mar. 22, 1977 |
| 4,141,309 | Robert V. Halboth | Feb. 27, 1979 |

The vehicles disclosed in these six latter mentioned patents all require complex and time consuming conversion and have no amphibious capability allowing the vehicle to alternately travel between ice and water. Accordingly, it is still yet another object of the present invention to provide a new and improved amphibious vehicle including a snowmobile which can travel over solid terrain and propel a boat hull through a body of water.

It is another object of the present invention to provide a new and novel amphibious vehicle of the type described wherein steering mechanism is provided which includes an outer terminal end disposed outwardly of the hull and inner end portion disposed inwardly of the hull.

Another object of the present invention is to provide a new and novel amphibious vehicle of the type described which includes an endless track having water propelling lugs thereon.

It has been found according to the present invention that the skis will steer the vehicle not only on ice and solid terrain but will also steer the vehicle in a body of water. Toward this end, the present invention includes rudder plates mounted on the tops of the skis. Accordingly, it is yet another object of the present invention to provide new and improved skis for supporting the vehicle on solid terrain and also for steering the vehicle through a body of water.

When the amphibious vehicle inadvertently breaks through the ice and floats on water, it is important for the skis to negotiate over the edge of the ice floating atop the water as the vehicle emerges from the water and transfers onto the ice. Accordingly, it is another object of the present invention to provide new and novel guide mechanism for guiding the front of the vehicle upwardly to lift the front of the skis to a level above the edge of the ice as the vehicle is in transition from the body of water onto the ice.

Still another object of the present invention is to provide an amphibious vehicle of the type described including guide mechanism which is inclined forwardly to lift the front of the vehicle as the amphibious vehicle negotiates the edge of the ice floating on the surface of the body of water being traversed.

Still another object of the present invention is to provide an amphibious vehicle of the type described which includes new and novel roller guide mechanism mounted on the guides for bearing against the ice edge as the vehicle transitions from the water onto the ice.

It is a further object of the present invention to provide a new and novel amphibious vehicle of the type described which includes a new and novel hull having an upwardly extending downwardly opening pocket for receiving the front upturned ends of the skis.

Another object of the present invention is to provide a new and novel amphibious vehicle of the type described including a floatation hull which includes a pair of laterally spaced apart, upwardly extending downwardly opening pockets for receiving the steering rudders mounted atop the skis.

It is yet another object of the present invention to provide a new and novel amphibious vehicle which includes an endless track serving as a propulsion unit either on land or in the water.

Still another object of the present invention is to provide an amphibious vehicle including a new and novel hull having elongate upwardly extending downwardly opening pockets for receiving stabilizing arms provided with the snowmobile steering mechanism.

These and other objects of the present invention will become more readily apparent as the description hereof proceeds forward.

SUMMARY OF THE INVENTION

An amphibious vehicle including an upwardly opening boat hull provided with an aperture there-through; and a snowmobile, received in the aperture and mounted and sealed to the boat hull in such a manner as to prevent the passage of water between the snowmobile and the boat hull, including an endless drive track for forwardly propelling the vehicle through water and on solid terrain.

These and other objects of the present invention will be more readily described by reference to the accompanying drawings which:

BRIEF DESCRIPTION OF DRAWINGS

FIG. 1 is a side elevational view illustrating only the boat hull portion of an amphibious vehicle for floatably supporting a snowmobile;

FIG. 2 is a side elevational view, similar to FIG. 1, of an amphibious vehicle constructed according to the present invention incorporating the boat hull of FIG. 1 and a snowmobile supported thereon;

FIG. 18 is a top plan view similar to FIG. 4 of a slightly modified amphibious vehicle including a slightly modified hull construction; and FIG. 19 is a top plan view similar to FIG. 3 of only the boat hull portion embodiment illustrated in FIG. 18.

DESCRIPTION OF PREFERRED EMBODIMENT

Figure 3:
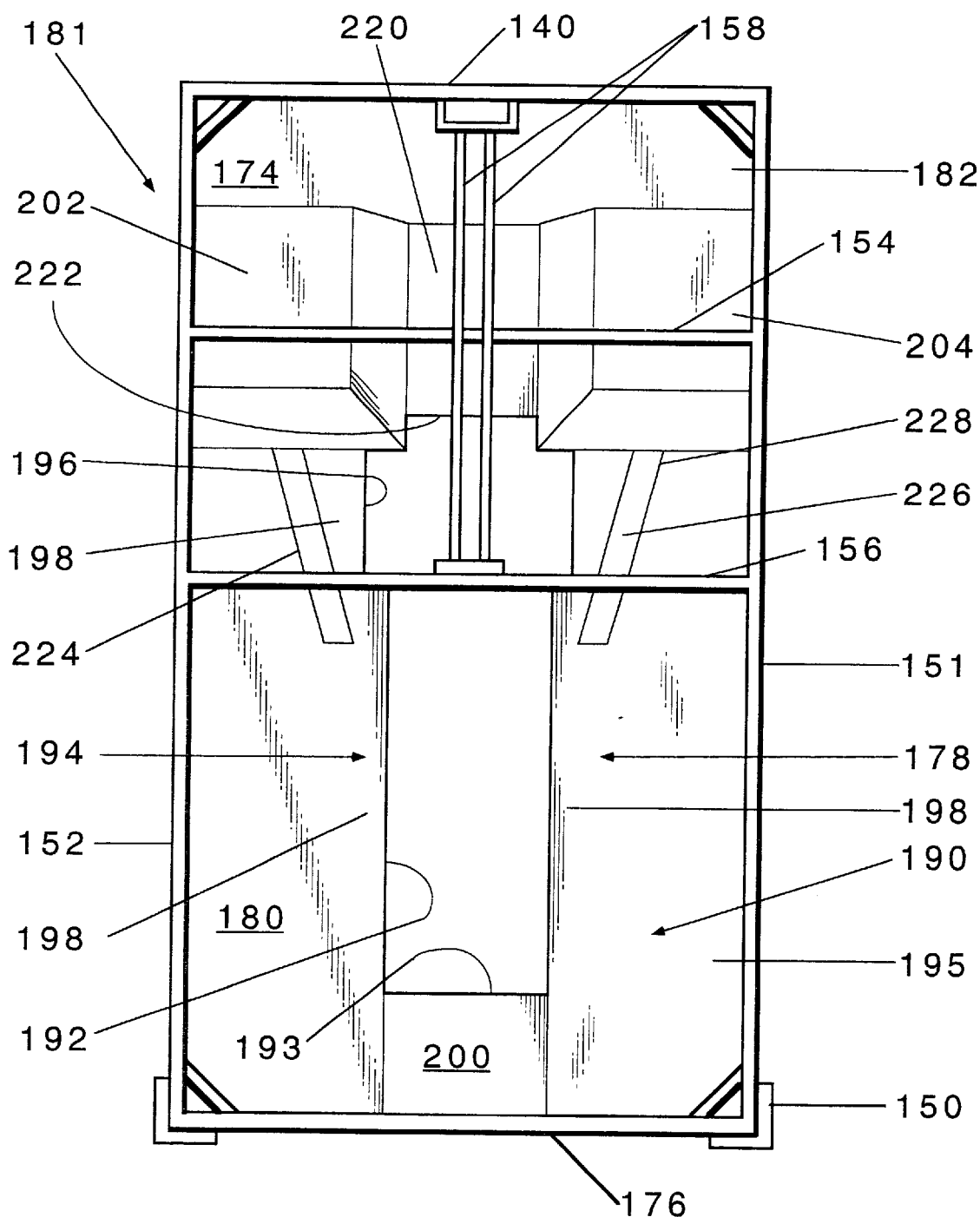
FIG. 3 is a top plan view of the boat hull illustrated in FIG. 1.

An amphibious vehicle, generally designated 10, constructed according to the present invention, includes a boat hull, generally designated 12, mounting a snowmobile, generally designated 14. The vehicle 10 can continuously and alternately traverse either a body of water W or solid terrain, such as ground G, or a layer of ice I floating atop the surface S of the body of water W.

The snowmobile 14 comprises an elongate frame, generally designated 16, including an elongate, downwardly opening tunnel 18 (FIG. 15) which mounts an endless track, generally designated 20, via a suitable suspension system, generally designated 22, that includes longitudinally spaced, front drive and rear idler sprocket wheels 26 and 28, respectively, and a plurality of idler wheels 28 that bear against the inside surface 30 of the track 20. The frame 16 includes a forward bulk head 17 which may be generally characterized as an upwardly opening hollow container having a bottom wall, front and rear walls 13 and 15, and side walls 21. The tunnel 18 has an inverted U-shape and includes an upper base 23 and a pair of laterally spaced elongate legs 25 depending therefrom.

The track 20 includes an endless belt 31 of resilient material, such as rubber, having a plurality of longitudinally spaced apart integral lugs 34 which preferably are of substantially greater height than that normally found on a snowmobile track and also act as paddles for propelling adjacent portions of the water W as will be described more particularly hereinafter.

When the vehicle 10 is traveling over hard terrain G, the track lugs 34 will move in an endless path represented by the arrow 40 to forwardly propel the vehicle in the direction of the arrow 42. The snowmobile drive belt 32 includes upper and lower, generally parallel belt runs 48 and 50, respectively, coupled at their adjacent ends by semi-circular front and rear end portions 52 and 54, respectively. Mounted atop the base 23 of the tunnel 18 (FIG. 15) is an elongate seat, generally designated 36, by which one or more drivers may sit by straddling the seat. Integrally mounted on the opposite sides of the legs 25 of the tunnel 18 are a pair of horizontally disposed, elongate running boards 37 on which the feet of a person sitting on the seat 36 are supported.

Figure 4:
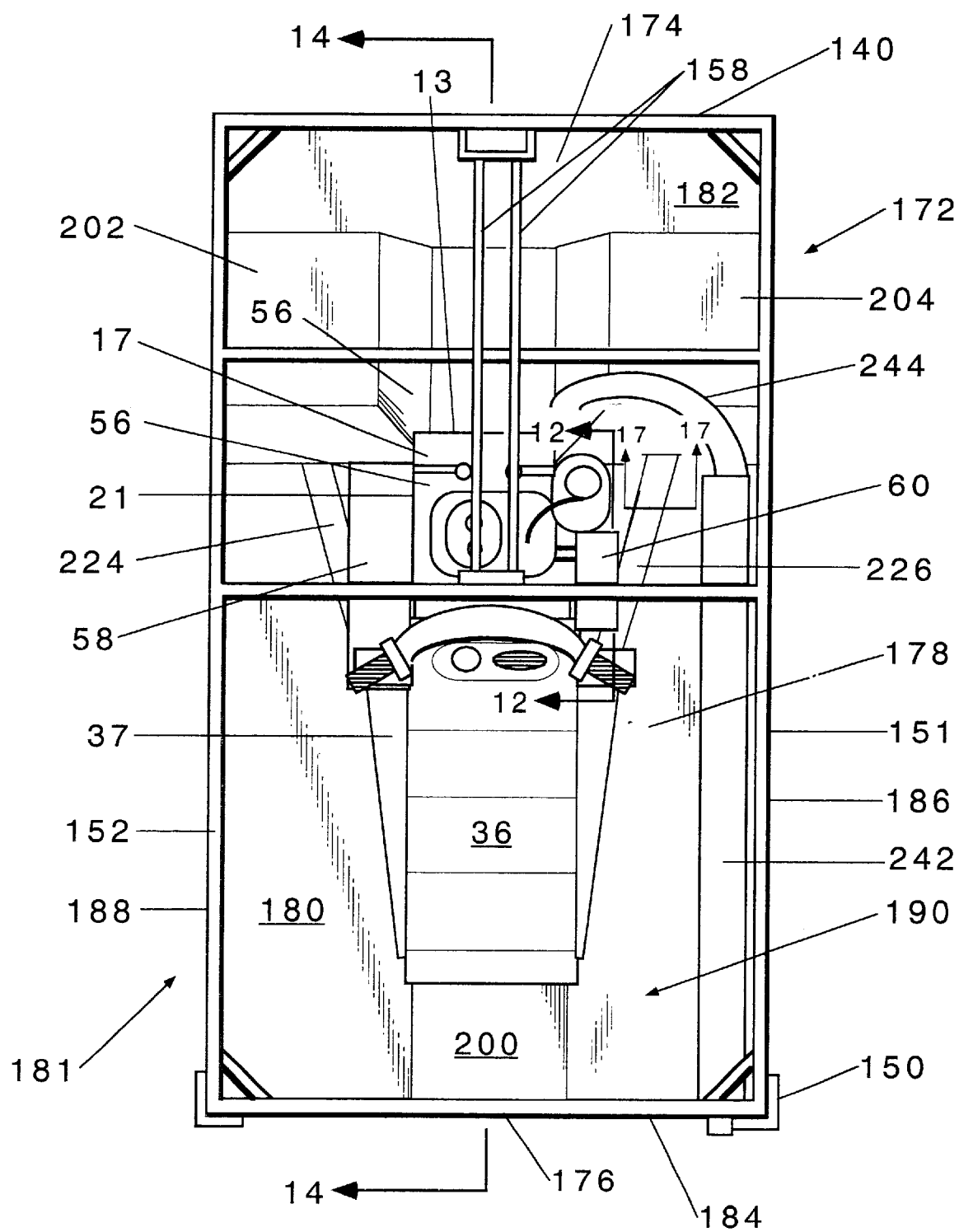
FIG. 4 is a top plan view of the amphibious vehicle illustrated in FIG. 2.
Figure 12:
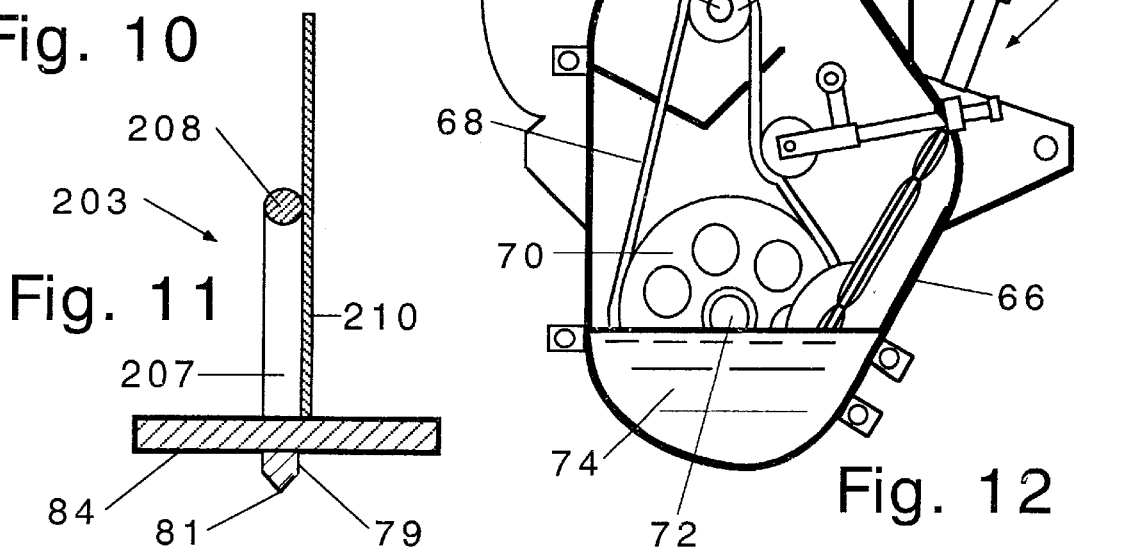
FIG. 12 is a greatly enlarged sectional view, taken along the section line 12—12 of FIG. 4, more particularly illustrating a portion of the drive train for driving an endless track on the snowmobile.
Figure 13:
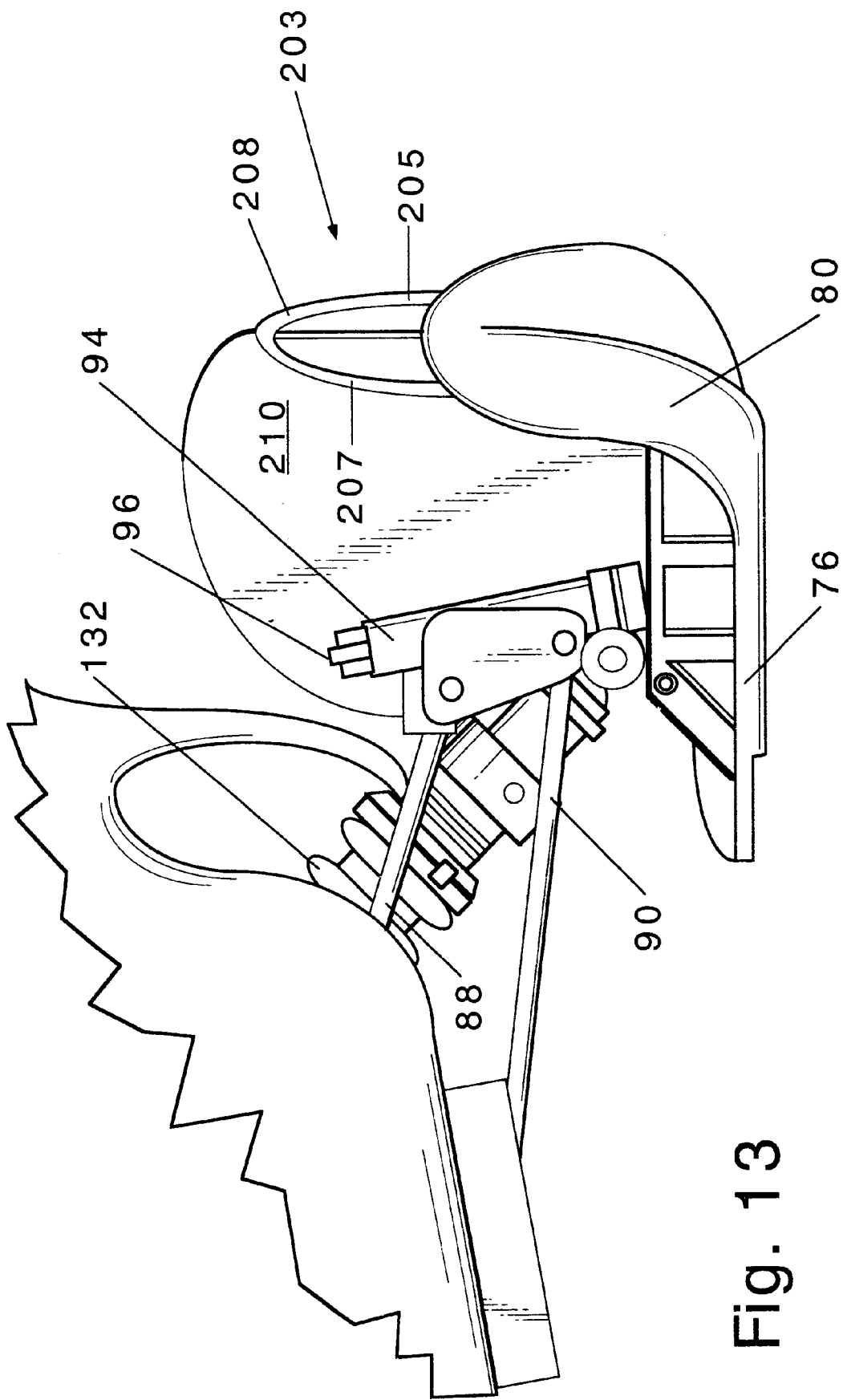
FIG. 13 is a greatly enlarged front perspective view of the ski assembly illustrated in FIG. 6, taken along the section line 13—13 of FIG. 9.
Figure 14:
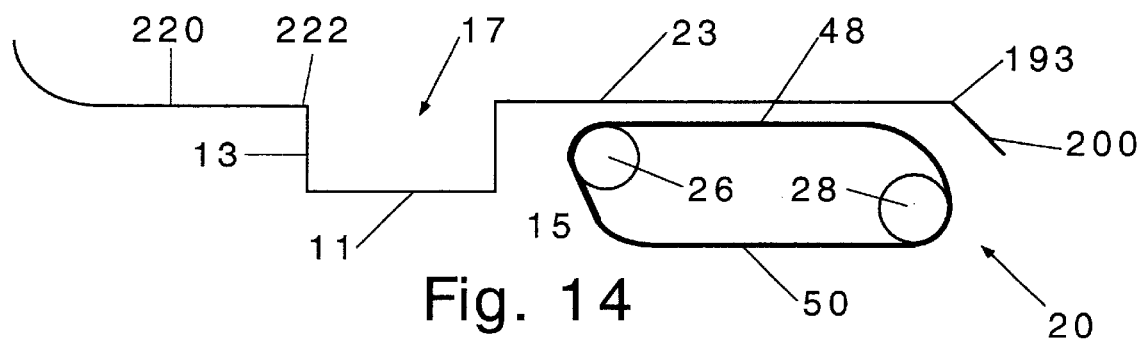
FIG. 14 is a schematic sectional side view schematically illustrating the outline of portions of the snowmobile, taken along the section line 14—14 of FIG. 4.

A gasoline engine, generally designated 56, is provided on the snowmobile frame 16 for driving the endless track 20 and is coupled to the drive track 20 via a clutch, generally designated 58 on the left side of the machine as illustrated in FIG. 4, and a drive train, generally designated 60, disposed on the right side of the snowmobile as illustrated in FIGS. 4 and 12. The drive train 60 includes a shaft 62 coupled to a sprocket 64, disposed within a housing 66, and the engine 56, via the clutch 58. The drive train 60 further includes a drive chain 68 trained around the sprocket wheel 64 and a greatly enlarged sprocket wheel 70 which is fixed on a drive shaft 72 on which the front drive sprocket wheel 24 is mounted for driving the drive track 20. Lubricating oil, generally designated 74, may be provided in the lower end of the casing 66 for lubricating the chain 68.

The snowmobile 14 includes steering apparatus, generally designated 74, including a pair of laterally spaced apart longitudinally extending skis 76 each having a rear end 78, an upturned forward toe end 80, and top and bottom sides 82 and 84, respectively. An elongate wear bar 79 is coupled to the ski underside 84 which is sharpened to provide a sharp lower cutting edge 81.

Figure 6:
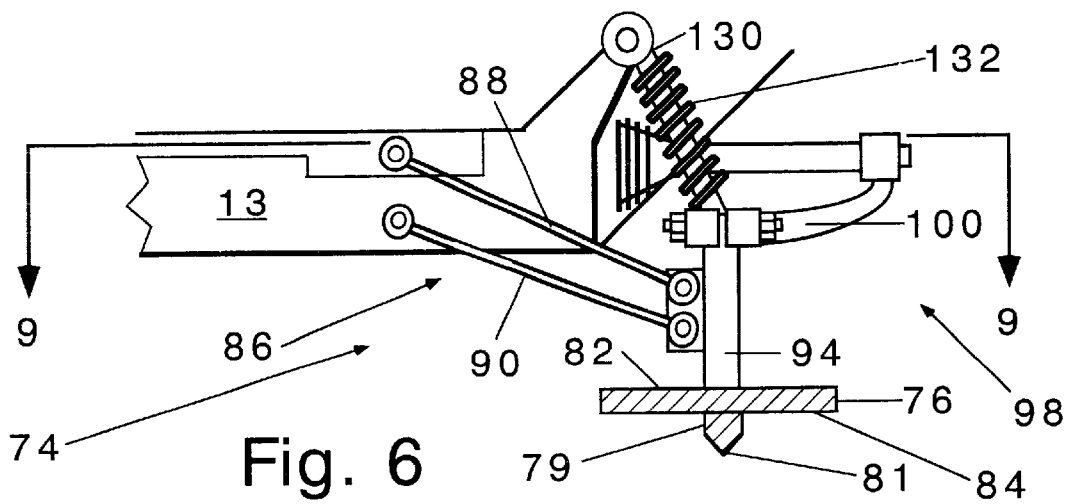
FIG. 6 is a schematic front sectional view, taken along the section line 6—6 of FIG. 9 schematically illustrating a portion of the steering assembly and suspension system for one steering ski assemblies.
Figure 7:
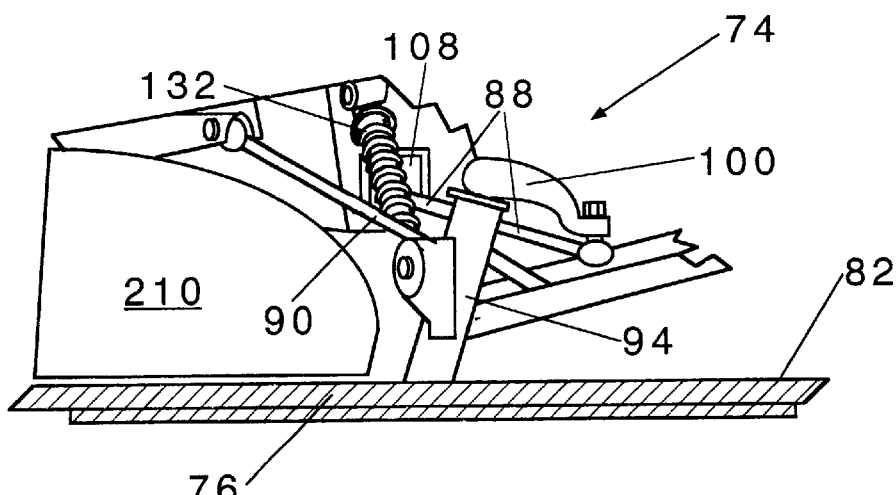
FIG. 7 is a front perspective view of the steering ski assembly illustrated in FIG. 6, taken along the section line 7—7 of FIG. 9.
Figure 8:
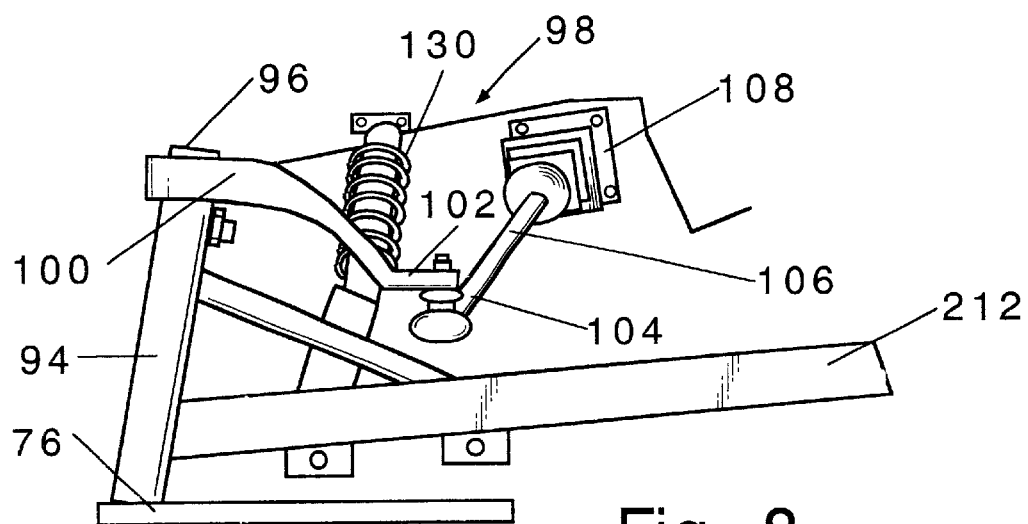
FIG. 8 is a rear perspective view of the steering ski assembly illustrated in FIG. 6, taken along the section line 8—8 of FIG. 9.

The steering apparatus 74 also includes a pair of parallelogram linkage systems, generally designated 86, (FIGS. 6 and 9), each having upper and lower links 88 and 90, respectively, pivotally mounted at their laterally inner ends to the front bulkhead wall 13. The opposite laterally outer ends of the links 88 and 90 are pivotally coupled to a sleeve 94 which rotatably receives a steering shaft 96 (FIG. 10) that is fixed to the top side 82 of each ski 76.

Figure 9:
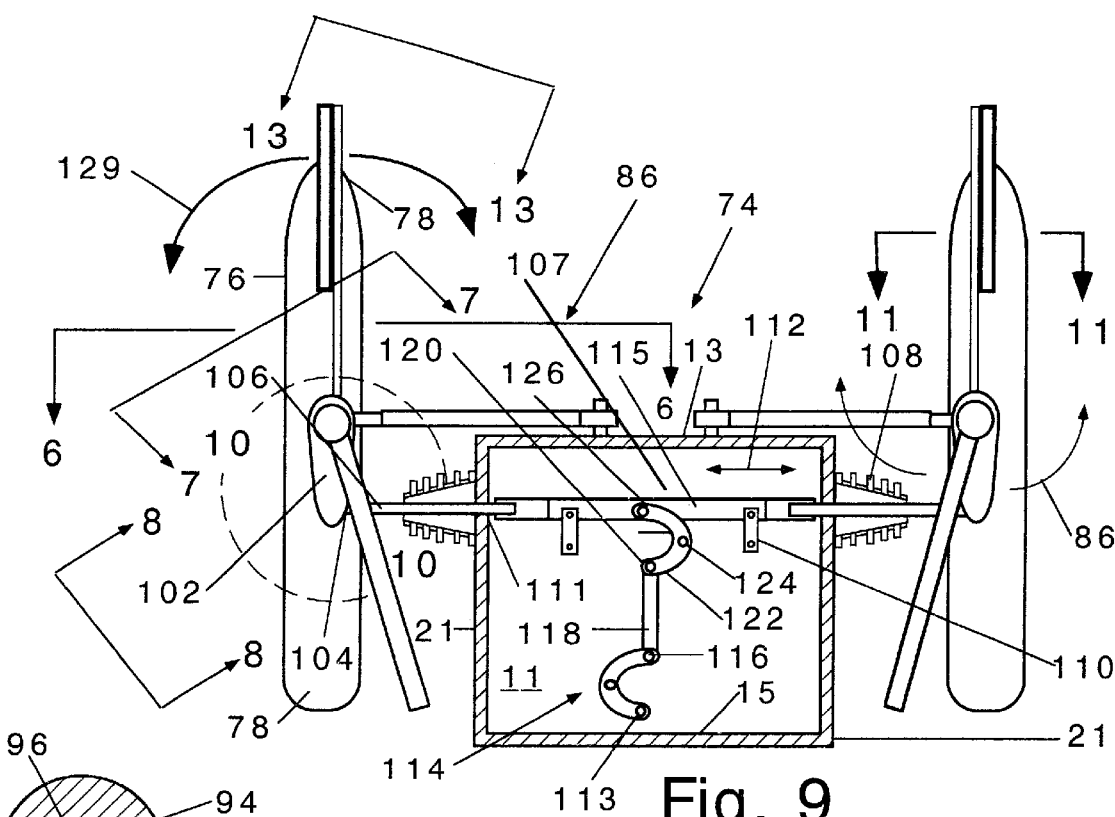
FIG. 9 is a schematic top plan sectional view, taken along the section line 9—9 of FIG. 6, through a bulkhead portion of the snowmobile frame.

The steering shaft 96 is turned about its axis by a steering linkage system, generally designated 98, including rearwardly extending steering arm 100 fixed at its forward end to the upper end of each shaft 96 and pivotally coupled at its rearward end 102 to a laterally outer end 104 of a horizontally disposed, horizontally reciprocally movable steering bar 106 that is slidingly received by aperture 111 in the bulk head sidewalls 21 as illustrated in FIG. 9. The steering bar 106 is sealed to the bulkhead sidewall 21 in water impervious relation by seals 108 to preclude the passage of water there-between. Pivot mounts 110 are provided on the bulk head for slideably reciprocally mounting the steering bar 106 for movement in to-and-fro reciprocal paths represented by the arrows 112.

The steering bar 106 is reciprocated via an upstanding steering post 113 pivotally coupled at its lower end to a bell crank 114, on the inner upper side of the hull, which is pivotally coupled at 116 to a linkage 118 that in turn is pivotally coupled at 120 to a bell crank 122. The bell crank 122 is pivotally mounted on the bulk head at 124 and has an opposite terminal end 126 pivotally coupled to the inner intermediate portion 107 of the steering bar 106 for reciprocally moving the steering bar 106 in the reciprocal paths represented by the arrows 112. The upper end of the steering post 113 is coupled to manually graspable handle bars generally designated 128. The skis 16 swingably travel in to-and-fro horizontal swinging paths of travel 129 (FIG. 9) at a level below the boat hull 12 and support the front of the boat hull 12 in spaced relation with solid terrain G being traversed in a directly forward path of travel.

Figure 5:
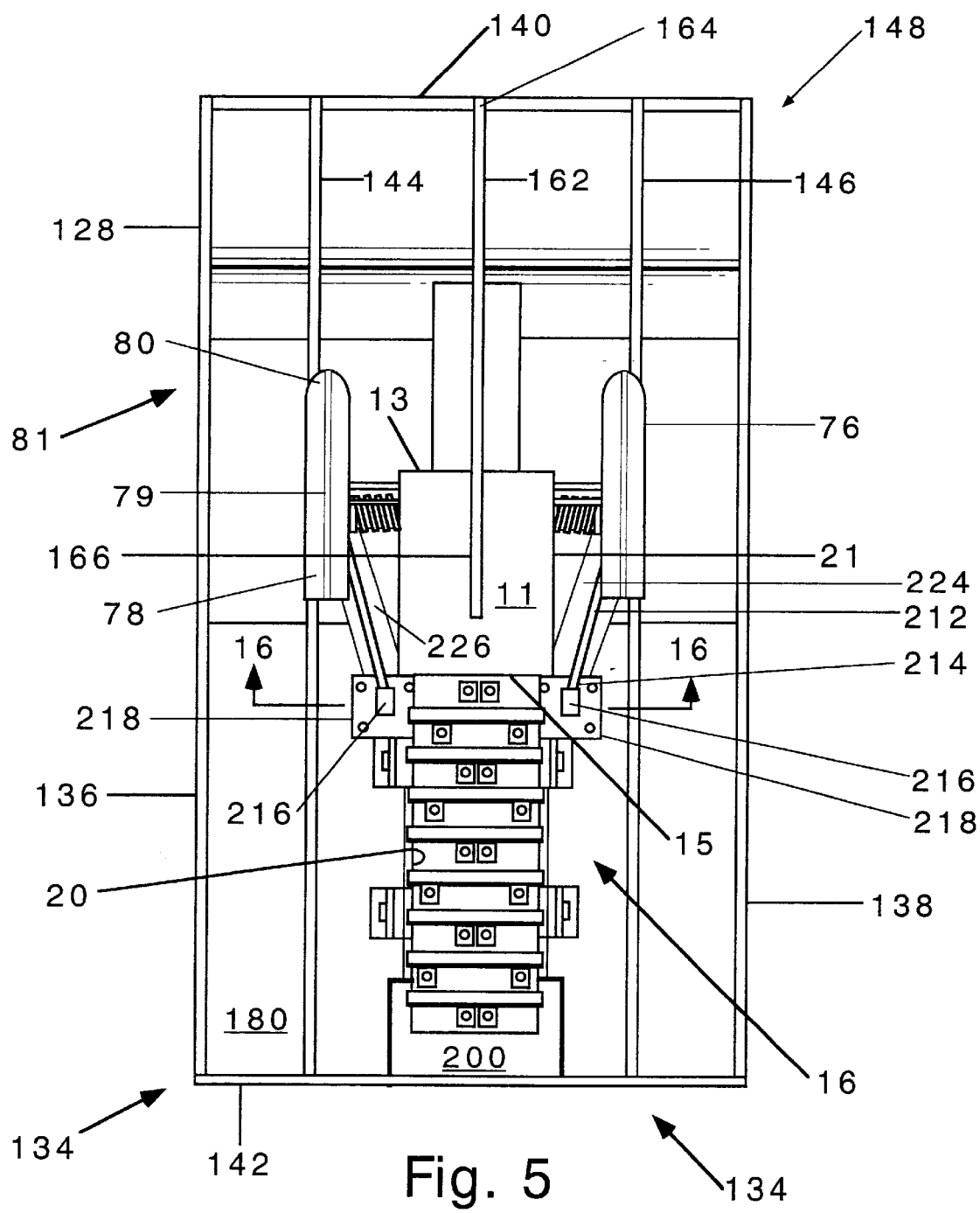
FIG. 5 is an under plan view of the amphibious vehicle illustrated in FIGS. 2 and 4.

The boat hull 12 is provided for floatably supporting the snowmobile 14 as the amphibious vehicle 10 negotiates the body of water W. The boat hull 12 includes a frame, generally designated 134 (FIG. 5), which may suitably comprise aluminum material, including laterally outer elongate floor supporting side rails 136 and 138 spanned by front and rear cross bars 140 and 142, respectively. A second pair of laterally elongate inner floor supporting 144 and 146 also span the front and rear end rails 140 and 142. The front end portions 148 of the frame bars 136, 138, 144 and 146 are inclined forwardly upwardly as illustrated in FIGS. 1 and 2. A pair of upstanding rear frame posts or angle irons 150 project upwardly from the rear ends of the side bars 136 and 138. A pair of laterally spaced apart top side rails 151 and 152 span the upper ends of rear posts 150 and the laterally opposite ends of front bar 140.

A pair of longitudinally spaced reinforcing cross bars 154 and 156 span the intermediate portions of the side bars 151 and 152. A pair of laterally spaced apart reinforcing bars 158 are fixed to the front rail 140 and the rail 154 for supporting a canvas cover or the like, generally designated 160. The hull frame 134 also includes a bottom stub stringer 162 which is fixed at its upper front end 164 to the front cross bar 140 and at its rear end 166 to the bulk head bottom wall 11.

Welded or otherwise suitably fixed to the inside of the hull frame 134 is a water impervious aluminum skin, generally designated 172, including a front end skin portion, generally designated 174, a rear end skin portion, generally designated 176, and an intermediate skin portion, generally designated 178. The skin 172 includes a central floor 180 and a perimetrically disposed sidewall 181 extending perimetrically about the central floor 180. The sidewall 181 includes an upwardly inclined front wall 182, rear wall 184, and laterally spaced side walls 186 and 188 defining an upwardly opening cavity 190 serving as a passenger compartment. The floor 180 of the intermediate portion 178 includes an elongate snowmobile frame receiving aperture 192 therethrough for receiving the snowmobile frame 16.

Figure 15:
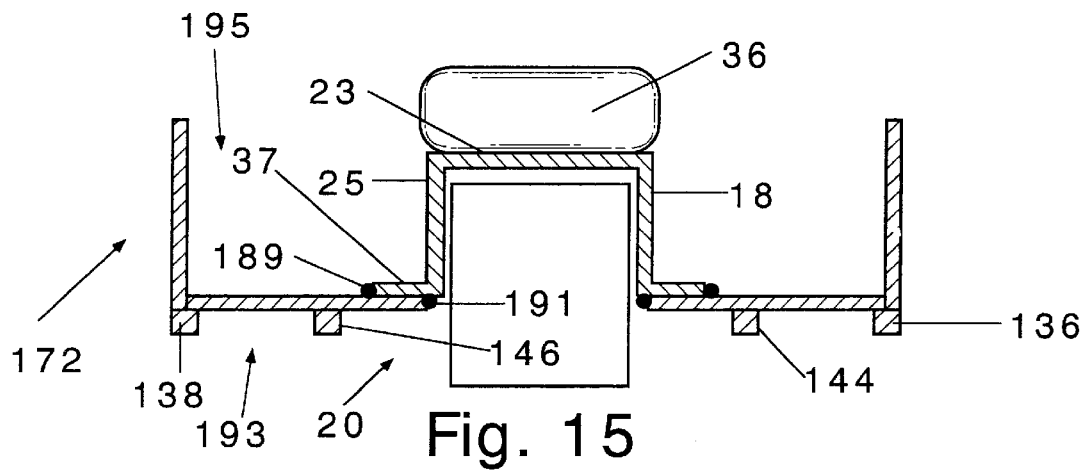
FIG. 15 is a rear schematic sectional end view taken along the section line 15—15 of FIG. 2 schematically illustrating the hull sealed to the snowmobile frame illustrated in FIG. 14.

The elongate slot 192 includes a rearward end 194, which receives the tunnel portion 18 of the frame 16, of a predetermined width and a slightly wider rectangular front end aperture portion 196 of a slightly greater width which receives the bulk head 17 portion of the frame 16. The floor 180 includes edge portions 198, defining the aperture 192, sealed to the frame 16 including the bulkhead 17 and the tunnel 18 in water impervious relation to preclude water W from passing between the aluminum skin 172 and the snowmobile frame 16 from the hull underside 193 to the inner hull upperside 195. Such sealing can be accomplished by welding the adjacent contiguous portions of the snowmobile 14 and the hull 12 as illustrated at 189 and 191 (FIG. 15).

In the area of the bulkhead 17, the hull 12 is sealed via welding to the upper edges of the bulkhead walls 13, 15 and 21 so that the laterally outer and inner end portions 104 and 107, respectively of the steering bar 106 are disposed on the inner upper side 195 and lower outer side 193, respectively of the hull 12.

As illustrated in FIGS. 1 and 4, the skin portion 200 rearwardly of the opening 192 is upwardly forwardly inclined and is welded to the rear end 193 of the base 23 of tunnel 18 in water impervious relation to preclude the passage of water there between. The skin is also welded at 189 and 191 (FIG. 15) to the running boards 37 in water impervious relation.

The forward skin portion 220 between the wells 202 and 204 includes a rearward end 222 welded to the upper end of the front bulk head wall 13 in water impervious relation. The hull frame 134 and aluminum skin 172 include a pair of laterally spaced apart upwardly extending, downwardly opening, open-ended wells or pockets 202 and 204, respectively, which freely receive the upturned forward end of the skis.

As illustrated, at least a front portion of the upper track run 48 is disposed at a level above the hull floor 180 and the lower belt run 50 is disposed at a level below the floor 180.

As the amphibious vehicle 10 negotiates bumps in the hard terrain G, the front upturned ski ends 80 will bounce or be upwardly deflected, in the direction of the arrow 200, against the biasing force of shock absorber springs 130 which cushion the ride.

Mounted on the upper side of each ski is a curvilinear toe bar 203 having a forward end 205 fixed to the upturned ski end 80, a rear end 207 to the top side 82 between said ski ends 78 and 80 and an intermediate curvilinear portion 208 spaced from the topside 82. Fixed to the top side 82 of each ski is a steering rudder plate 210 which projects upwardly above the front ski tip 80 and is freely received in the pockets 202 and 204 as the skis 76 are upwardly moved, in the direction of the arrow 200.

Figure 16:
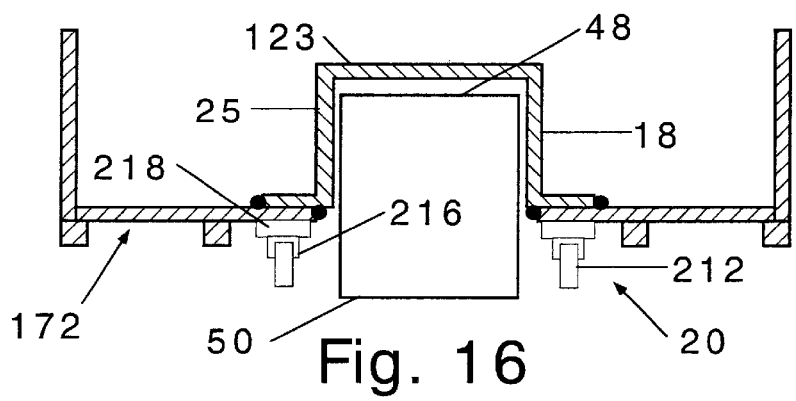
FIG. 16 is a rear sectional schematic end view taken along the section line 16—16 of FIG. 5, schematically illustrating the rear mounts for the steering stabilizer bars coupled to the underside of the boat hull.
Figure 17:
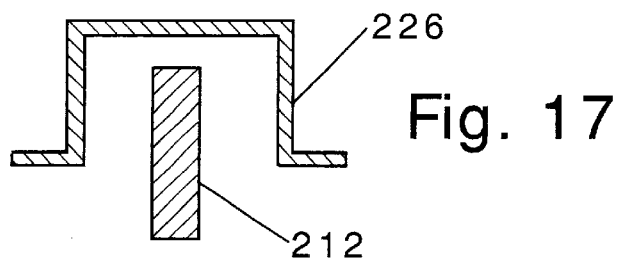
FIG. 17 is an enlarged sectional end view of one of the downwardly opening pockets for receiving one of the steering stabilizer bars, taken along the section line 17—17 of FIG. 4.

The steering apparatus 74 also includes a pair of laterally spaced apart longitudinally extending trailering stabilizer bars 212 for longitudinally stabilizing the front to rear movement of the skis 76. The stabilizer bars 212 include rear ends 214 coupled at 216 (FIGS. 5 and 16) to a pair of reinforcing plates 218 welded To the under side of the aluminum skin and underlying a forward portion of the running boards 37. The front ends 218 of stabilizer bars 212 are pivotally coupled to the vertical steering sleeves 84.

A shock absorber, generally designated 130, is disposed between, and pivotally coupled to, the frame 16 and each stabilizer bar 212. The shock absorber 130 includes a dampening spring 132 for cushioning the impact of skis negotiating uneven terrain.

The floor 180 also includes a pair of longitudinally extending laterally spaced apart upwardly projecting, downwardly opening, open-ended elongate wells or pockets 224 and 226, on laterally opposite sides of the central slot or aperture 196, for receiving the stabilizer bars 212, as the skis negotiate bumpy terrain and pivot upwardly, from the positions illustrated in FIG. 1. The forward ends 228 of the stabilizer bar receiving pockets 224 and 226 are in open communication with the ski receiving pockets 202 and 204.

As schematically illustrated in FIG. 2, the amphibious vehicle traveling through the body of W water will frequently encounter a layer of ice I floating on the water surface S. To prevent the underside of the boat hull 12 from being damaged by the ice I and to insure that the hull 12 will raise sufficiently rapidly that the front ski ends 80 will clear upper ice edge 241, a pair of upwardly forwardly inclined ramp or transition guide bars 228 are welded to the underside of the front hull portion 148. The ramp bars each include a rear end 230 received in one of the ski tip receiving pockets 202 and 204. The ramp bars 228 are welded or otherwise suitably fixed to the underside of the laterally spaced apart stringers 136 and 138. The intermediate portion 134 of the ramp bars 238 is spaced from the underside of the boat hull and each mounts a ramp wheel 236 which will bear against the ice edge 241 to upwardly guide the hull and the underlying snowmobile 14 and skis 76 supported thereon over the ice edge 241 during the transition of the snowmobile moving from the water W onto the ice I.

An exhaust pipe 242 is coupled to the engine 56 via a manifold 244 and projects through the rear wall 184.

THE OPERATION

The amphibious vehicle 10 can be propelled over solid terrain G by the drive track 20 bearing against the terrain G. The skis 76 and the track 20 will support the hull underside 193 of the hull 134 in vertically spaced relation with the terrain G. The skis 76 may be turned via the handlebars 128 to direct the forward direction of travel when the vehicle 10 is traveling along hard surface G oar through the body of water W.

The skis 76 and rudder plates 210 will bounce up and down as the vehicle 10 negotiates uneven terrain causing the trailering stabilizer arms 212 to swing upwardly, in the direction of arrow 200, into the elongate pockets 224 and 226 and the rudder plates 210 into the pockets 202 and 204. Turning the handlebars 128 inside the boat hul 12 will turn the skis 76. The rudder plates 210, atop the skis 76, will function as rudders for controlling the direction of travel of the amphibious vehicle through the body of water W. When the amphibious vehicle 10 is traversing a body of water W, the hull 14 will keep the vehicle 10 afloat and track lugs 26 serve as water paddles on the lower belt run 50, for rearwardly propelling the adjacent portion of the water W to forwardly propel the vehicle 10 in the direction of the arrow 42.

As the vehicle 10 approaches a solid surface such as ice I atop the water W, the ramp bars 228 and guide wheels 240 will bear on the edge 241 of the ice I to upwardly guide the hull 12 and the skis 76 over the edge 241 of the ice I onto the ice surface G to be supported thereon.

ALTERNATE EMBODIMENT

Referring now more particularly to FIGS. 18 and 19, a modified amphibious vehicle, generally designated 10A, is illustrated and is similar in many respects to the amphibious vehicle 10 and corresponding parts will be referred to by corresponding reference characters followed by the subscript A.

Figure 10:
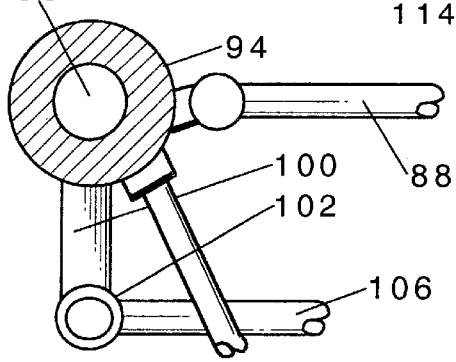
FIG. 10 is an enlarged top plan view of the portion encircled in the chain line circle 10—10 of FIG. 9.
Figure 11:
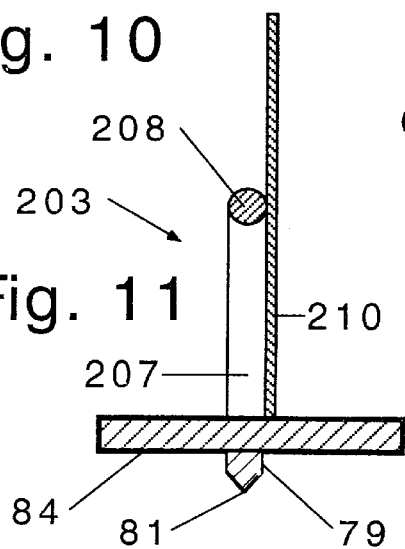
FIG. 11 is a greatly enlarged front sectional end view of the rudder mounted on one of the skis, taken along the section line 11—11 of FIG. 9.

The amphibious vehicle 10A is generally similar to that illustrated in FIG. 10 except that the bow B is curvilinear and includes such rails 151A and 152A having ends 151A2 and 152A2 which are forwardly curved as illustrated.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. In combination:
   an upwardly opening boat hull, floatable in a body of water, having
      a front end,
      a rear end, and
      an intermediate portion between said front and rear ends including
         laterally spaced apart longitudinal sides between said ends, and an elongate snowmobile receiving opening there through disposed laterally inwardly of said laterally spaced sides; and a snowmobile for traversing solid terrain, such as a layer of ice floating on the surface of said body of water, received in said opening and coupled to said intermediate portion of said hull in water impervious relation to preclude water from passing between said snowmobile and said intermediate portion of said hull said snowmobile including an endless drive track, movable in an endless path for engaging the underlying solid terrain and for rearwardly propelling water in the body of water to forwardly propel the snowmobile and the hull on either the solid terrain or through the body of water;

an engine for driving said endless track in said endless path;

a pair of laterally spaced steerable skis each having a rear end, an upturned forward end, a bottom side for engaging solid terrain and a top side; and steering means mounting said skis for turning movement in to-and-fro, generally horizontal, swinging paths of travel at a level below said boat hull to support the front end of said boat hull in spaced relation with the solid terrain being traversed and to guide the direction of the forward path of travel;

said boat hull including an upper side and an underside; said underside including at least one upwardly extending, downwardly opening, open-ended ski receiving pocket therein for freely receiving said front upturned ends of said skis.

2. In combination:

an upwardly opening boat hull, floatable in a body of water, having
 a front end,
 a rear end, and
 an intermediate portion between said front and rear ends including
  laterally spaced apart longitudinal sides between said ends, and
  an elongate snowmobile receiving opening there through disposed laterally inwardly of said laterally spaced sides;

a snowmobile for traversing solid terrain, such as a layer of ice floating on the surface of said body of water, received in said opening and coupled to said intermediate portion of said hull in water impervious relation to preclude water from passing between said snowmobile and said intermediate portion of said hull;

said snowmobile including an endless drive track, movable in an endless path for engaging the underlying solid terrain and for rearwardly propelling water in the body of water to forwardly propel the snowmobile and the hull on either the solid terrain or through the body of water;

an engine for driving said endless track in said endless path;

a pair of laterally spaced steerable skis each having a rear end, an upturned forward end, a bottom side for engaging solid terrain and a top side; and steering means mounting said skis for turning movement in to-and-fro, generally horizontal, swinging paths of travel at a level below said boat hull to support the front end of said boat hull in spaced relation with the solid terrain being traversed and to guide the direction of the forward path of travel; and an upstanding, elongate steering rudder mounted on said upper side of at least one of said skis for steering said hull in the body of water.

3. The combination set forth in claim 2 wherein said hull includes an upwardly extending, downwardly opening pocket therein for freely receiving said front upturned ends and said upstanding rudder mounted on each of said skis.

4. The combination set forth in claim 2 wherein said skis each include a curvilinear elongate toe bar having a front end fixed to said front end of said ski, a longitudinally spaced rear end fixed to said top side of said ski and an upwardly extending curvilinear bar portion between said front and rear ends of said elongate toe bar; said steering rudder being fixed to said elongate curvilinear toe bar on each of said skis.

5. In combination:

an upwardly opening boat hull, floatable in a body of water, having
 a front end,
 a rear end, and
 an intermediate portion between said front and rear ends including
  laterally spaced apart longitudinal sides between said ends, and
  an elongate snowmobile receiving opening there through disposed laterally inwardly of said laterally spaced sides; and a snowmobile for traversing solid terrain, such as a layer of ice floating on the surface of said body of water, received in said opening and coupled to said intermediate portion of said hull in water impervious relation to preclude water from passing between said snowmobile and said intermediate portion of said hull;

said snowmobile including an endless drive track, movable in an endless path for engaging the underlying solid terrain and for rearwardly propelling water in the body of water to forwardly propel the snowmobile and the hull on either the solid terrain or through the body of water;

an engine for driving said endless track in said endless path;

a pair of laterally spaced steerable skis each having a rear end, an upturned forward end, a bottom side for engaging solid terrain and a top side; and steering means mounting said skis for turning movement in to-and-fro, generally horizontal, swinging paths of travel at a level below said boat hull to support the front end of said boat hull in spaced relation with the solid terrain being traversed and to guide the direction of the forward path of travel;

said hull being partially immersible in a body of water to be traversed and including an underside and an upper side;

said combination further including guide means mounted on said underside of said hull for upwardly guiding said front end of said hull onto any solid terrain, such as ice, adjacent the surface of the body of water being traversed, to upwardly guide said hull and said skis out of the body of water onto said adjacent solid terrain;

said guide means including roller means for engaging the adjacent solid terrain during the transition from the body of water onto the solid terrain; said guide means being upwardly forwardly inclined and mounting said roller means at a level in spaced relation with the underlying solid terrain when the hull is traversing the solid terrain.

6. In combination:
an upwardly opening boat hull, floatable in a body of water, having
a front end,
a rear end, and
an intermediate portion between said front and rear ends including
laterally spaced apart longitudinal sides between said ends, and
an elongate snowmobile receiving opening there through disposed laterally inwardly of said laterally spaced sides; and
a snowmobile for traversing solid terrain, such as a layer of ice floating on the surface of said body of water, received in said opening and coupled to said intermediate portion of said hull in water impervious relation to preclude water from passing between said snowmobile and said intermediate portion of said hull;
said snowmobile including
an endless drive track, movable in an endless path for engaging the underlying solid terrain and for rearwardly propelling water in the body of water to forwardly propel the snowmobile and the hull on either the solid terrain or through the body of water;
an engine for driving said endless track in said endless path;
a pair of laterally spaced steerable skis each having a rear end, an upturned forward end, a bottom side for engaging solid terrain and a top side; and
steering means mounting said skis for turning movement in to-and-fro, generally horizontal, swinging paths of travel at a level below said boat hull to support the front end of said boat hull in spaced relation with the solid terrain being traversed and to guide the direction of the forward path of travel;
said boat hull including an upper side and an underside; said underside including at least one upwardly extending, downwardly opening, open-ended ski receiving pocket therein for freely receiving said front upturned ends of said skis;
said hull including an inner upperside and a lower underside, said steering means includes a moveable steering bar having opposite outer ends disposed below at least a portion of the said underside of said hull and an intermediate inner steering bar portion between said opposite outer ends disposed on said upperside of said hull;
said steering means including an elongate trailing stabilizer arm, coupled between said opposite ends of said steering bar and each of said skis for vertical swinging movement relative to said hull, to longitudinally stabilize said skis relative to said hull;
said hull including a pair of laterally spaced apart, elongate, upwardly extending, downwardly opening open-ended pockets, for freely receiving said stabilizer arms therein.

7. The combination set forth in claim 6 wherein said hull includes at least one upwardly extending, downwardly opening, open-ended ski receiving pocket therein for freely receiving said front upturned ends of said skis; said ski receiving pocket being disposed forwardly of, and in open communication with said-pair of pockets.

8. An amphibious vehicle operable to alternately traverse either a body of water or an underlying solid terrain, such as ice floating atop said body of water, said amphibious vehicle comprising:
a boat including a hollow hull, partially immersible in the body of water, for supporting the vehicle when the vehicle is traversing the body of water;
said hull having an upper side and an underside and including
a front end portion,
a rear end portion, and
an intermediate portion between said front and rear end portions provided with a first elongate aperture therethrough; and
a snowmobile including an elongate frame received in said first aperture;
means for coupling said frame to said hull in water impervious relation to preclude water from passing upwardly between said snowmobile and said hull from said underside to said topside;
said snowmobile further including
an endless drive track mounted on said frame for movement in an endless path of travel to forwardly propel the vehicle through the body of water or over the underlying terrain; said track including a lower track run disposed at a level below said underside of said hull; and
steering means for steering the vehicle on the solid terrain or in the body of water including
at least one steerable shaft having an inner end portion disposed at a level above said upper side of said hull and an outer end portion disposed below the underside of said hull, and
ski means mounted on said outer end portion at a level below the underside of said hull to support said hull in spaced relation with any solid terrain being traversed and for acting as a rudder to guide the forward path of travel of the vehicle through the body of water;
said ski means including a pair of laterally spaced apart skis each including top and bottom sides and forward and rearward ends; and vertically disposed rudder means mounted on said top side of said forward end of each ski for guiding the path of the hull through the body of water.

9. An amphibious vehicle operable to alternately traverse either a body of water or an underlying solid terrain, such as ice floating atop said body of water, said amphibious vehicle comprising:
a boat including a hollow hull, partially immersible in the body of water, for supporting the vehicle when the vehicle is traversing the body of water;
said hull having an upper side and an underside and including
a front end portion,
a rear end portion, and
an intermediate portion between said front and rear end portions provided with a first elongate aperture therethrough; and
a snowmobile including an elongate frame received in said first aperture;
means for coupling said frame to said hull in water impervious relation to preclude water from passing upwardly between said snowmobile and said hull from said underside to said topside;
said snowmobile further including
an endless drive track mounted on said frame for movement in an endless path of travel to forwardly propel the vehicle through the body of water or over the underlying terrain; said track including a lower track run disposed at a level below said underside of said hull; and steering means for steering the vehicle on the solid terrain or in the body of water including
at least one steerable shaft having an inner end portion disposed at a level above said upper side of said hull and an outer end portion disposed below the underside of said hull, and
ski means mounted on said outer end portion at a level below the underside of said hull to support said hull in spaced relation with any solid terrain being traversed and for acting as a rudder to guide the forward path of travel of the vehicle through the body of water;
said ski means including a pair of laterally spaced apart skis each including top and bottom sides, a rear end and a front upturned end; a curvilinear reinforcing bar mounted on said top side of said front end, and a vertical rudder plate mounted on said top side for directing the forward path of travel of the vehicle through a body of water.

10. The amphibious vehicle set forth in claim 9 including upwardly forwardly inclined transition guide means mounted on the underside of said front end portion of said hull for bearing against and vertically guiding on the edge of any ice formed on the body of water as the vehicle emerges from the body of water onto the solid terrain.

11. In combination:
a snowmobile having
an elongate frame;
an endless driving track including a lower track run for engaging a solid terrain to be traversed and an upper track run;
means mounting said track on said frame for movement in an endless path for engaging solid terrain to be traversed;
an engine for driving said track in said endless path,
a steerable shaft having an inner end for coupling to a hand graspable steering member and an outer end;
steerable ski means coupled to said outer end for bearing against solid terrain to be traversed; and
a boat having a hull provided with an elongate aperture therein receiving said frame for floatably supporting said snowmobile in a body of water to be traversed; and
means coupling said hull to said snowmobile in water impervious relation to preclude the passage of water between said hull and said snowmobile when the body of water is being traversed;
said lower run of said track being disposed at a level below said hull to support said hull in spaced relation with the solid terrain when the solid terrain is being traversed and to rearwardly propel water in the body of water to forwardly propel the hull and snowmobile when the body of water is being traversed;
said ski means including a rear end and a forward upturned end; said hull includes upwardly extending, downwardly opening pocket means for receiving said upturned end.

12. An amphibious vehicle operable to alternately traverse either a body of water or an underlying solid terrain, such as ice floating atop the body of water, comprising:
a snowmobile including
a frame;
an endless drive track for moving in an endless path to forwardly propel the vehicle on solid terrain and through the body of water;
an engine for driving said drive track in said endless path; and
steering means for steering the vehicle over the solid terrain including
ski means for bearing against the solid terrain being traversed; an upwardly opening boat hull for floatably supporting said snowmobile in the body of water; and
means coupling said boat hull to said snowmobile in water impervious relation to preclude water from passing between said boat hull and said snowmobile as said vehicle traverses the body of water;
said ski means including a pair of elongate skis each having a rear end and an upturned forward end;
said boat hull including a floor having a pair of laterally spaced apart upwardly projecting, downwardly opening ski tip receiving recesses for receiving said forward upturned ends of said skis.

13. An amphibious vehicle operable to alternately traverse either a body of water or an underlying solid terrain, such as ice floating atop the body of water, comprising:
a snowmobile including
a frame;
an endless drive track for moving in an endless path to forwardly propel the vehicle on solid terrain and through the body of water;
an engine for driving said drive track in said endless path; and
steering means for steering the vehicle over the solid terrain including
ski means for bearing against the solid terrain being traversed;
an upwardly opening boat hull for floatably supporting said snowmobile in the body of water; and
means coupling said boat hull to said snowmobile in water impervious relation to preclude water from passing between said boat hull and said snowmobile as said vehicle traverses the body of water;
said ski means including a pair of elongate skis, each having a rear end and an upturned forward end having top and bottom sides, and a vertically disposed steering rudder plate mounted on said upper side of said forward end for steering said vehicle as it travels through the body of water.

14. The amphibious vehicle set forth in claim 13 wherein said underside of said boat hull includes a pair of laterally spaced apart downwardly opening recesses for freely receiving said upturned forward ends and said steering rudder plates for movement therein.

15. The amphibious vehicle set forth in claim 14 wherein said steering means includes a pair of elongate training stabilizer arms vertically swingably coupled between said hull and said pair of skis for longitudinally stabilizing movement of said skis; said hull including a floor provided with a pair of elongate, upwardly extending, downwardly opening stabilizer receiving recesses for freely receiving said trailing arm stabilizer bars for vertical movement therein.

16. An amphibious vehicle operable to alternately traverse either a body of water or an underlying solid terrain, such as ice floating atop the body of water, comprising:
a snowmobile including
a frame;
an endless drive track for moving in an endless path to forwardly propel the vehicle on solid terrain and through the body of water;

an engine for driving said drive track in said endless path; and steering means for steering the vehicle over the solid terrain including ski means for bearing against the solid terrain being traversed;

an upwardly opening boat hull for floatably supporting said snowmobile in the body of water; and means coupling said boat hull to said snowmobile in water impervious relation to preclude water from passing between said boat hull and said snowmobile as said vehicle traverses the body of water;

said hull including a front end portion, rear end portion, an intermediate portion between said front and rear end portions, an inner upper side, and an outer underside; and guide means mounted on said hull for upwardly guiding said front end portion on the solid terrain, as the vehicle is forwardly propelled;

said guide means comprising upwardly forwardly inclined ramp means mounted on said underside of said front end portion of said hull for upwardly guiding said front end portion of said hull onto any solid terrain at the surface of the body of water;

said guide means including roller means for rolling on any solid terrain at the surface of the body of water.

17. An amphibious vehicle operable to alternately traverse either a body of water or an underlying solid terrain, such as ice floating atop the body of water, comprising:

a snowmobile including
  a frame;
  an endless drive track for moving in an endless path to forwardly propel the vehicle on solid terrain and through the body of water;
  an engine for driving said drive track in said endless path; and
  steering means for steering the vehicle over the solid terrain including
    ski means for bearing against the solid terrain being traversed;

an upwardly opening boat hull for floatably supporting said snowmobile in the body of water; and means coupling said boat hull to said snowmobile in water impervious relation to preclude water from passing between said boat hull and said snowmobile as said vehicle traverses the body of water;

said hull having an inner upper side and a lower underside and including a front end portion, rear end portion, and an intermediate portion, having laterally opposite sides, between said front and rear end portions; said intermediate portion including an elongate aperture therethrough and laterally inner aperture defining edge portions surrounding said elongate aperture; said frame of said snowmobile being received by said aperture and coupled in water impervious relation to said laterally inner aperture defining edge portions;

said frame being fixed to said aperture defining edge portions at a level in which said ski means is disposed at a level spaced from said underside of said hull to dispose said hull in spaced relation with the solid surface being traversed;

said ski means including a pair of laterally spaced apart elongate skis disposed below the underside of said front end portion of said hull swingably mounted on said frame for to-and-fro swinging movement below the underside of said hull about an upwardly extending axis; said steering means including a laterally moveable steering bar having
  laterally opposite outer ends disposed on the outer underside of said hull and
  an intermediate bar portion, between said laterally opposite outer ends, disposed on the inner upper side of said hull;

means pivotally coupling one of said laterally outer ends of said steering bar to each of said skis; and means on the inner upper side of said hull coupled to said intermediate bar portion for laterally moving said bar in either lateral direction to swing said skis in a to-and-fro swinging path of travel.

18. The amphibious vehicle set forth in claim 17 including seal means disposed around said steering bar and coupled to said frame for sealing said steering bar to said frame in water impervious relation.

19. The amphibious vehicle set forth in claim 17 wherein an upstanding elongate steering rudder is mounted on each of said skis for steering the vehicle in the body of water.

20. An amphibious vehicle operable to alternately traverse either a body of water or an underlying solid terrain, such as ice floating atop the body of water, comprising:

a snowmobile including
  a frame;
  an endless drive track for moving in an endless path to forwardly propel the vehicle on solid terrain and through the body of water;
  an engine for driving said drive track in said endless path; and
  steering means for steering the vehicle over the solid terrain including
    ski means for bearing against the solid terrain being traversed;

an upwardly opening boat hull for floatably supporting said snowmobile in the body of water;

means coupling said boat hull to said snowmobile in water impervious relation to preclude water from passing between said boat hull and said snowmobile as said vehicle traverses the body of water; and upstanding, elongate steering plate rudder means projecting upwardly from said ski means for controlling the forward direction of the vehicle as the vehicle traverses the body of water.

21. The amphibious vehicle set forth in claim 20 wherein said ski means includes a pair of laterally spaced apart skis each having a top, side, bottom side, and lateral edges, a rear end and a forward upturned end, a ski toe curvilinear bar having front and rear bar ends attached to the top side of each of said forward upturned end and an intermediate bar portion, between said front and rear bar ends, disposed in spaced relation with said topside of said ski; and further including upstanding elongate steering plate rudder mounted adjacent said ski toe curvilinear bar.

22. An amphibious vehicle operable to alternately traverse an underlying solid terrain, such as ground or ice, or a body of water comprising:

a boat including an upwardly opening hollow water impervious boat hull partially immersible in the body of water to be traversed when the vehicle is traversing the body of water;

said boat hull including
  an inner upperside and an outer underside,
  a front end portion,
  a rear end portion, and an intermediate hull portion between said front and rear end portions; and a snowmobile including
a frame mounted on said boat hull and coupled thereto in such a manner as to prevent the passage of water between said frame and said boat hull from the underside of said hull to the inner upperside of said hull when the vehicle traverses the body of water;
an endless drive track mounted on said frame for movement in an endless path for bearing against underlying solid terrain to be traversed and for displacing water in the body of water being traversed to forwardly propel the vehicle; and
steering means for steering the vehicle including steerable ski means for directing the forward path of the vehicle when the vehicle is traversing either solid terrain or the body of water; and
upstanding elongate steering rudder plate means projecting upwardly from said ski means for steering the vehicle as the vehicle traverses the body of water.

23. The amphibious vehicle set forth in claim 22 wherein said hull includes at least one upwardly projecting, downwardly opening pocket for receiving said steering rudder plate means for free movement therein.

24. The amphibious vehicle set forth in claim 22 wherein said ski means includes a pair of laterally spaced apart skis each including a rear end and a front upturned end, said steering rudder plate means including a vertically disposed steering plate mounted on the upturned end of each ski extending rearwardly toward said rear end of each ski.

25. The amphibious vehicle set forth in claim 24 wherein said boat hull includes a pair of laterally spaced apart, upwardly projecting, downwardly opening pockets for receiving said front upturned ends of said skis for free unobstructed movement therein.

26. The amphibious vehicle set forth in claim 25 wherein said pockets receive said steering plates therein for free, unobstructed movement therein.

27. The amphibious vehicle set forth in claim 26 wherein said steering means includes a pair of laterally spaced apart trailing stabilizer arms coupled between said hull and said skis to longitudinally stabilize said skis relative to said frame; said hull floor including a second pair of laterally spaced longitudinally extending, upwardly projecting, downwardly opening pockets for receiving said stabilizer arms therein.

28. The amphibious vehicle set forth in claim 27 wherein said second pair of pockets includes forward open ended ends in open communication with said first pair of pockets.

29. An amphibious vehicle operable to alternately traverse an underlying solid terrain, such as ground or ice, or a body of water comprising:
a boat including an upwardly opening hollow water impervious boat hull partially immersible in the body of water to be traversed when the vehicle is traversing the body of water;
said boat hull including
an inner upperside and an outer underside,
a front end portion,
a rear end portion, and
an intermediate hull portion between said front and rear end portions; and a snowmobile including
a frame mounted on said boat hull and coupled thereto in such a manner as to prevent the passage of water between said frame and said boat hull from the underside of said hull to the inner upperside of said hull when the vehicle traverses the body of water;
an endless drive track mounted on said frame for movement in an endless path for bearing against underlying solid terrain to be traversed and for displacing water in the body of water being traversed to forwardly propel the vehicle; and
steering means for steering the vehicle including steerable ski means for directing the forward path of the vehicle when the vehicle is traversing either solid terrain or the body of water;
said steering means including trailing ski stabilizing bar means coupled between said hull and said ski means to stabilize front to rear relative movement of said ski means relative to said hull;
said hull including at least one longitudinally extending, upwardly projecting, downwardly opening pocket for receiving said stabilizer bar means.

30. An amphibious vehicle operable to alternately traverse an underlying solid terrain, such as ground or ice, or a body of water comprising:
a boat including an upwardly opening hollow water impervious boat hull partially immersible in the body of water to be traversed when the vehicle is traversing the body of water;
said boat hull including
an inner upperside and an outer underside,
a front end portion,
a rear end portion, and
an intermediate hull portion between said front and rear end portions; and a snowmobile including
a frame mounted on said boat hull and coupled thereto in such a manner as to prevent the passage of water between said frame and said boat hull from the underside of said hull to the inner upperside of said hull when the vehicle traverses the body of water;
an endless drive track mounted on said frame for movement in an endless path for bearing against underlying solid terrain to be traversed and for displacing water in the body of water being traversed to forwardly propel the vehicle;
steering means for steering the vehicle including steerable ski means for directing the forward path of the vehicle when the vehicle is traversing either solid terrain or the body of water; and
guide means on said underside of said hull for upwardly guiding said front end portion on any solid terrain, such as ice, contiguous to the upper surface of the body of water being traversed as the vehicle is being forwardly propelled through the body of water to upwardly guide said front end portion onto the solid terrain;
said guide means including roller means for rolling on the contiguous solid terrain as said underside is being upwardly guided.

31. An amphibious vehicle operable to alternately traverse an underlying solid terrain, such as ground or ice, or a body of water comprising:
a boat including an upwardly opening hollow water impervious boat hull partially immersible in the body of water to be traversed when the vehicle is traversing the body of water;
said boat hull including
an inner upperside and an outer underside,
a front end portion,
a rear end portion, and
an intermediate hull portion between said front and rear end portions; and a snowmobile including a frame mounted on said boat hull and coupled thereto in such a manner as to prevent the passage of water between said frame and said boat hull from the underside of said hull to the inner upperside of said hull when the vehicle traverses the body of water;

an endless drive track mounted on said frame for movement in an endless path for bearing against underlying solid terrain to be traversed and for displacing water in the body of water being traversed to forwardly propel the vehicle; and steering means for steering the vehicle including steerable ski means for directing the forward path of the vehicle when the vehicle is traversing either solid terrain or the body of water;

guide means on said underside of said hull for upwardly guiding said front end portion on any solid terrain, such as ice, contiguous to the upper surface of the body of water being traversed as the vehicle is being forwardly propelled through the body of water to upwardly guide said front end portion onto the solid terrain;

said guide means comprising upwardly forwardly inclined ramp means mounted on said underside of said front end portion of said hull for upwardly guiding said front end portion on any contiguous solid terrain adjacent the surface of the body of water;

said guide means including roller means mounted on said ramp means.

32. A float boat for floatably supporting a snowmobile on a body of water comprising:

a hollow upwardly opening boat hull for partially immersing in the body of water including
a floor,
longitudinally spaced front and rear end wall portions projecting upwardly from said floor, and
laterally spaced side wall portions projecting upwardly from said floor and spanning said front and rear end wall portions;
said floor including
an elongate snowmobile receiving aperture therethrough for receiving a snowmobile therein; and
a pair of laterally spaced apart, upwardly projecting, downwardly opening, openended ski receiving pockets for individually freely receiving a snowmobile steering ski therein.

33. The float boat set forth in claim 32 wherein said floor includes a second pair of laterally spaced, elongate, upwardly extending, downwardly opening, open-ended pockets for receiving underlying steering portions of the snowmobile.

34. The float boat set forth in claim 33 wherein said second pair of pockets include front open ends opening into said ski receiving pockets in open communication therewith.

* * * * *